(12) United States Patent
Van Der Loop et al.

(10) Patent No.: US 6,380,961 B1
(45) Date of Patent: Apr. 30, 2002

(54) METHOD FOR SUPPRESSING PHANTOM IMAGES

(75) Inventors: Gerardus C. W. Van Der Loop, Venlo; Cornelis A. W. Ophelders, Echt, both of (NL)

(73) Assignee: Oce Technologies B.V., Veno (NL)

( * ) Notice: Subject to any disclaimer, the term of this patent is extended or adjusted under 35 U.S.C. 154(b) by 0 days.

(21) Appl. No.: 09/680,428

(22) Filed: Oct. 6, 2000

(30) Foreign Application Priority Data

Oct. 12, 1999 (EP) ............................................. 99203322

(51) Int. Cl.[7] ........................ G03G 15/00; G03G 13/01
(52) U.S. Cl. ........................ 347/131; 347/115; 358/1.9
(58) Field of Search ................................ 347/115, 116, 347/131; 358/1.9, 530, 448, 300

(56) References Cited

U.S. PATENT DOCUMENTS 4,884,188 A 11/1989 Berkout et al.
5,032,853 A * 7/1991 Van Stiphout et al. ...... 347/116

FOREIGN PATENT DOCUMENTS

| DE | A1-3401992 | 7/1984 |
| EP | A2326429 | 8/1989 |
| EP | A1373704 | 6/1990 |
| JP | 1-300275 | * 12/1989 |

* cited by examiner

*Primary Examiner*—Joan Pendegrass
(74) *Attorney, Agent, or Firm*—Birch, Stewart, Kolasch & Birch, LLP

(57) ABSTRACT

A method for suppressing phantom images in a digital copying or printing process wherein toner material in the form of pixels of image information (D (x,y), in which D is the image density for point x,y, is transferred through a sequence of process steps from a photoconductive surface to an image-recording medium, where at least one process step is influenced in a predetermined manner by at least one preceding process step for the same surface point x,y, which comprises connecting the image information for each pixel of image information to be printed on the basis of image information D(x,y-$\Delta$y1) for at least the pixel associated with the same surface point x,y, and said preceding process step, thereby compensating for the influence of said preceding process step.

9 Claims, 4 Drawing Sheets

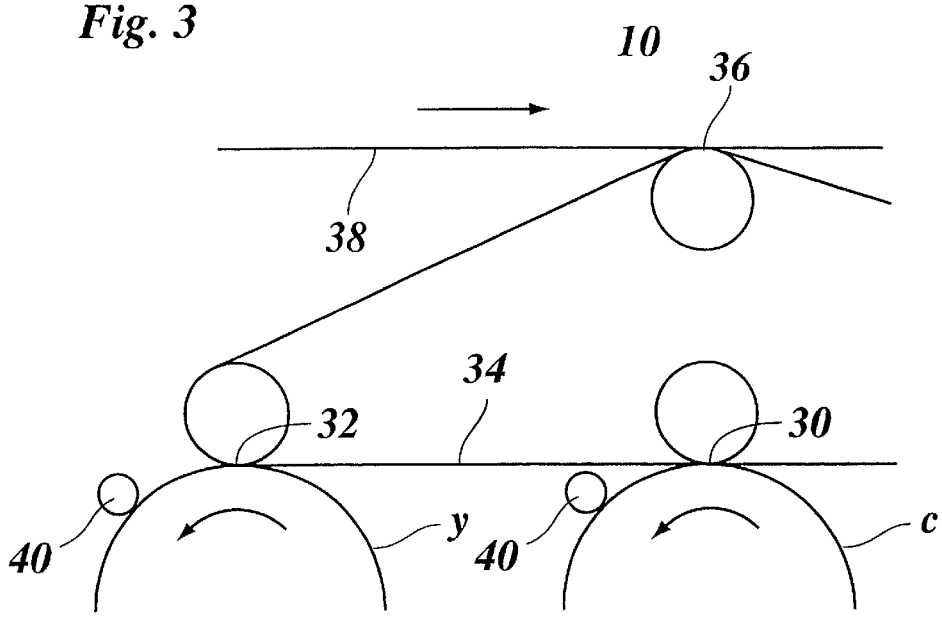
Fig. 3
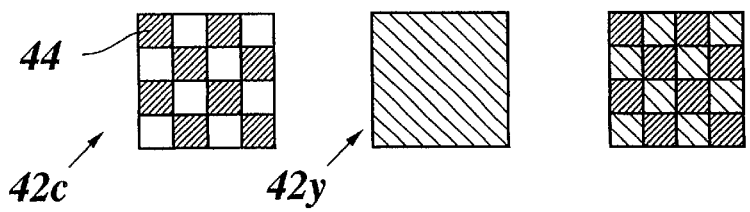
Fig. 4    (A)    (B)    (C)
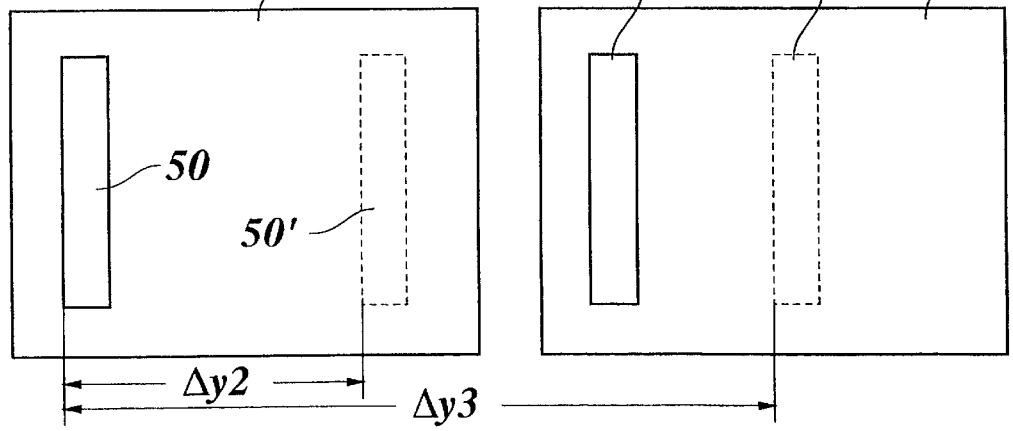
Fig. 5

METHOD FOR SUPPRESSING PHANTOM IMAGES

BACKGROUND OF THE INVENTION

The present invention relates to a method for suppressing phantom images in a digital copying or printing process comprising a developing step in which:

toner material is transferred to or from a surface of a support medium, each point of said surface is subject to a sequence of process steps, each pair consisting of a point of said surface and a process step of said sequence is associated with a pixel of image information to be printed, and said process steps include at least one step which is influenced in a predetermined way by at least one preceding process step for the same surface point.

One example for a digital or printing process to which the present invention is applicable is the electrophotographic process, in which a latent electrostatic charge pattern is formed by a laser or LED exposure of a photoconductive drum or belt in accordance with a dot like image pattern. The charge pattern is then moved past a developing zone, where it is developed with toner powder, e.g. by a magnetic brush process using a donor drum to which the toner adheres by magnetic attraction. The toner is supplied on the surface of the donor drum which, in this case, forms the above-mentioned support medium. The above-mentioned process steps are the steps in which a given point on the surface of the donor drum reaches the developing zone, and toner is either transferred onto the photoconductor or not, depending on the charge state of the photoconductor, i. e. on the image information of the pixel to be printed. Thus, some portions on the surface of the donor drum will loose their toner layer, whereas other portions of this drum remain coated with toner. During further rotation of the donor drum, new toner is supplied from a reservoir, so that an apparently uniform toner layer is re-established on the surface of the donor drum.

It turns out, however, that the toner layer on the surface of the donor drum is not completely uniform. In those portions, where toner had been transferred to the photoconductor and had been replaced by new toner from the reservoir, the thickness, physical structure and/or composition (e.g. particle size distribution) of the toner layer is slightly different from the conditions of the toner layer in the other portions, where a toner layer had constantly remained on the surface. In case of a two-component developer comprising carrier particles and toner particles, a difference may also be caused by the fact that the developer becomes exhausted, i.e. becomes deprived of toner particles. The next process step in the sequence is reached when the same point on the surface of the donor drum reaches the developing zone once again. Due to the above-mentioned differences in the constitution of the toner layer, the process of toner transfer in this subsequent step will to some extent be influenced by the "history" of the donor drum. This influence may become visible on the printed image in the form of a phantom image.

This effect and other effects leading to phantom images will be explained in greater detail in the description of the preferred embodiments.

The occurrence and intensity of phantom images will generally depend on various parameters of the developing process, such as the strength of electric and/or magnetic fields in the developing zone, gap width or contact pressure in the developing zone, properties of the toner, surface properties of the support medium and the like. When these parameters are known, the intensity of phantom images is predictable and, to some extent, controllable on the basis of empirical data. An important conventional measure for suppressing phantom images is carefully cleaning of the support medium. However, the very properties of the toner which are normally desirable in the developing process, i.e. small particle size, high pigmentation and good adhesion, make the cleaning process difficult. In addition, too intensive cleaning may limit the lifetime of the components involved.

In black and white printing or copying, phantom images will normally be visible only on solid white or black parts of the image, and it is in most cases possible to suppress these phantom images to a sufficient extent by conventional measures. However, in halftone printing and especially in full color printing, the likelihood of visible phantom images is increased, because phantom images will also be visible in areas with a uniformly shaded or colored background in the form of a slight change in hue or density. Further, it is more difficult in these cases to suppress the phantom images by controlling the parameters of the developing process.

SUMMARY OF THE INVENTION

It is therefore an object of the present invention to provide a method for more efficiently suppressing phantom images in digital printing or copying, especially in halftone or full color printing or copying.

According to the present invention, in case of a digital copying or printing process as described in the preamble, this object is achieved by a digital image processing step in which the image information for each pixel to be printed is corrected on the basis of image information for at least the pixel associated with the same surface point and said preceding process step, thereby compensating for the influence of this preceding process step. Thus, according to the general concept of the invention, phantom images are suppressed by digital image processing. The invention then takes advantage of the fact that the occurrence and intensity of phantom images is predictable once the parameters of the process, e.g. developing, transfer and cleaning steps as well as average behavior such as aging behavior of the image registration member, intermediate transfer (when used) and toner and/or developer powder, are known. Since the phantom image is overlaid on the image to be printed in accordance with the image information, it is possible to correct the image information in such a way that the combined effect of the corrected image information and the phantom image gives the desired density of the image or, in case of color printing, of the color component to be printed.

BRIEF DESCRIPTION OF THE DRAWINGS

Preferred embodiments of the invention will now be explained in conjunction with the drawings, wherein:

FIG. 3 is a diagram for explaining other effects leading to phantom images in conjunction with color printing:

FIGS. 4(A)–(C) show pixels developed in accordance with a complementary developing process;

FIG. 5 illustrates phantom images occurring due to the effects explained in conjunction with FIG. 3;

DETAILED DESCRIPTION OF THE INVENTION

A first example of an effect leading to phantom images will now be explained in conjunction with FIGS. 1 and 2.

Figure 1:
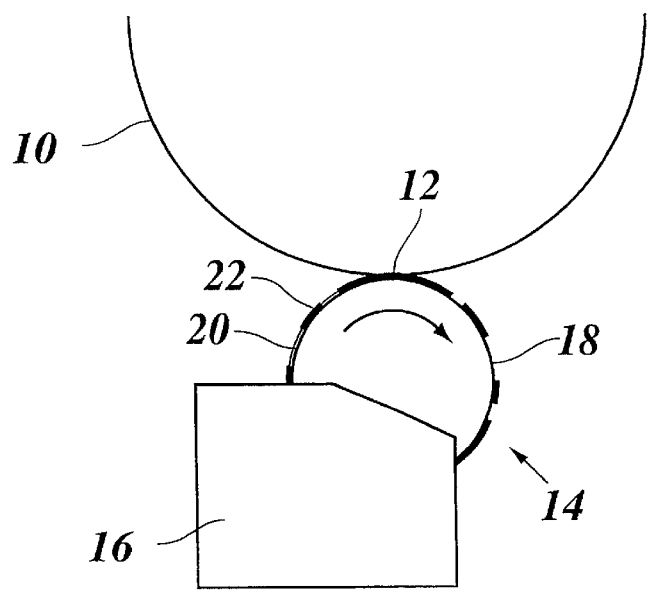
FIG. 1 is a diagram illustrating an electrophotographic printing process to which the present invention is applicable.

FIG. 1 shows a photoconductive drum 10 of an electrophotographic copier or printer. The photoconductive drum 10 or belt is also termed herein as an image registration medium. A latent electrostatic charge pattern (not shown) has been formed on the surface of the drum 10, for example by means of laser exposure, in accordance with image information supplied to the printer. In a developing zone 12, the charge image on the surface of the drum 10 is developed with toner powder, as is commonly known in the art. The toner powder is supplied to the developing zone 12 on the surface of a donor drum 14. The surface of this donor drum 14 passes through a toner reservoir 16 where a substantially uniform layer of toner powder is deposited on the surface of the drum. Thus, the drum 14 serves as a support medium from which the toner powder is transferred to the photoconductive drum 10 in accordance with the image information represented by the electrostatic charge image. Considering a fixed point on the surface of the donor drum 14, this point will be involved in a sequence of developing process steps which occur each time when this point passes through the developing zone 12.

In those areas on the surface of the drum 14 where the toner has not been transferred to the photoconductive drum 10, the toner layer remains on the surface of the donor drum. In other areas, where the charge image has been developed, the toner layer has been removed, so that voids 18 are left in the toner layer. When the surface of the donor drum 14 passes through the toner reservoir 16, these voids 18 are replenished with toner, so that a substantially uniform toner layer is re-established before the next developing step occurs.

However, depending on the mechanism with which the toner from the reservoir 16 is applied to the surface of the drum 14, the properties of the toner, the surface properties of the donor drum, the transfer mechanism utilized in the developing zone 12 and the like, the constitution of the re-established toner layer in those regions 20 where a void had been created is different from the constitution of the toner layer in those regions 22 where the original toner layer had remained on the drum. Thus, the pattern of regions 20 and 22 may be considered as a phantom image on the surface of the donor drum 14. For example, such a phantom image may become significant when a large dark area had been developed in the preceding step, so that a large void 18 had been created and the toner supply from the reservoir 16 cannot fully satisfy the demand for new toner.

When, in such a case, a large dark area of the image is to be developed in the subsequent step, the regions 20 may lead to a somewhat smaller density of the developed image on the photoconductive drum 10, so that an inverted phantom image becomes visible on the printed copy.

Figure 2:
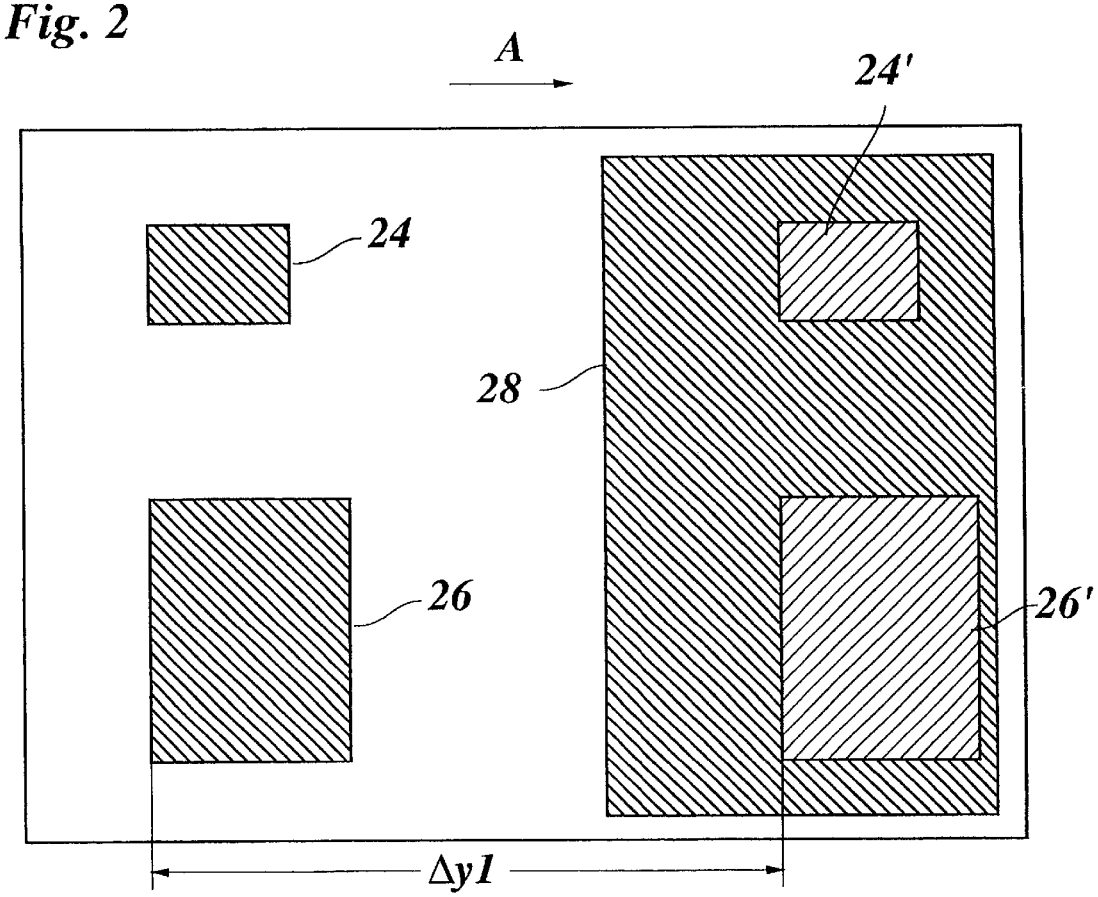
FIG. 2 illustrates the occurrence of phantom images on a printed page.

This is illustrated in FIG. 2, which shows a printed image of a page having two smaller dark areas 24 and 26 and a large dark area 28. The direction in which the developing process has proceeded is indicated by an arrow A. Thus, the smaller areas 24 and 26 have been developed earlier than the large dark area 28. When the donor drum 14 has made one full turn, the points on the donor drum corresponding to the dark areas 24 and 26 reach again the developing zone 12 and, due to shortage of toner, give rise to slightly lighter phantom images 24' and 26' on the dark background of the area 28. The offset Δy between the areas 24, 26 and their respective phantom images corresponds in this case to the circumferential length of the donor drum 14.

Other types of phantom images may occur in a color printing process of which an example is shown in FIG. 3.

Here, a plurality of photoconductive drums are provided, each carrying a developed toner image for one color component. FIG. 3 shows only two photoconductive drums c and y for the color components cyan and yellow. In transfer zones 30 and 32, the developed toner image of each color component is transferred onto an endless intermediate carrier belt 34 on which the color components are overlaid one upon the other. When the last color component (yellow in this example) has been applied, the belt 34 passes through a transfuse zone 36 where the full color image is transferred and fused onto an image recording medium 38 such as a sheet of copy paper.

Ideally, all the toner of the toner image present on the surface of the drum c should be transferred to the belt 34 in the transfer zone 30. In practice, it turns out however, that residues of toner remain on the surface of the drum c. Even though a cleaning roller 40 is provided for removing this residual toner, there may nevertheless be some remnants of toner which remain on the surface of the drum c and reach again the transfer zone 30 in the next cycle. This, again, leads to the occurrence of a phantom image on the belt 34 and finally on the recording medium 38.

In this case, the drum c is considered as the support medium, and each point on the surface of this drum is subject to a sequence of process steps (transfer steps) occurring each time this point passes through the transfer zone 30. The residual toner remaining on the surface of the drum 30 has an influence on the transfer process in the subsequent step. This effect is called "residual image effect". Of course, this effect may occur for each color component, and the corresponding phantom image will be visible as a slight shift in the hue of the printed image.

A similar effect occurs when the developing process is a so-called complementary process which will now be explained by reference to FIG. 4.

FIG. 4(A) shows one pixel 42c to be printed with the drum c for the color component cyan. This pixel consists of a plurality of sub-pixels 44 (16 in this example) which may either be developed with cyan toner or not be developed. Thus, by changing the number of sub-pixels to be developed, the density of the color component cyan can be varied in sixteen steps. In the shown example, eight of the sixteen sub-pixels are to be developed (shaded pixels) whereas the other eight sub-pixels remain white. This corresponds to a density of 50%. Although the shaded pixels are arranged according to a regular pattern in this example, an irregular pattern may be obtained, for example by dithering, in an alternative embodiment.

When a green pixel is to be obtained in the full color image, the white sub-pixels 44 in FIG. 4(A) have to be developed with yellow toner. FIG. 4(B) shows the corresponding pixel 42y of the developed image on the surface of the drum y. Although only eight yellow sub-pixels are needed, it can be seen that, in this example, all sixteen sub-pixels have been developed with yellow toner on the drum y. Thus, in the transfer zone 32, there will be an overlap between the cyan sub-pixels 44 applied in the zone 30 and the yellow sub-pixels to be superimposed thereon. However, as a result of the properties of the toners and the transfer conditions in the transfer zone 32, the cyan sub-pixels already present on the belt 34 will not accept the yellow toner, so that the yellow toner will only be transferred in the formerly white pixels, as is shown in FIG. 4(C).

Obviously, this complementary process has the advantage that is relatively tolerant to register errors in the superimposition of different color components. Another typical example in which the complementary process is applied is the case where, for example, a text in yellow letters has to be written on a cyan background. In this case, the letters of the text will be left white in the cyan process, and a solid block completely covering this text will be printed in the yellow process, so that the formerly white text areas will accept the yellow toner. It is a general characteristic of the complementary process that there exists an overlap between color components to be superimposed upon one another, although, in practice, the area of overlap may be limited and also the ranges of densities of the color components and the combinations of colors to which this process is applied may be limited. For a more detailed description of this complementary transfer process reference is made to EP 373704 and corresponding U.S. Pat. No. 5,032,853, the description of U.S. Pat. No. 5,032,853 being incorporated herein by reference.

In conjunction with the above-described residual image effect, it will be understood that large amounts of residual toner are left on the drum y when the complementary process is employed. This will give rise to the so-called "complementary residual image effect". Although these two types of residual image effect are similar, they should be distinguished from one another because the intensity of the resulting phantom images may be different. It has been found that, in the residual image effect, the toner accidentally remaining on the surface of the drum consists mainly of particles which have a very small size, so that a different particle size distribution of the toner will be encountered in the next transfer step. As a result, the transfer properties of the toner and hence the tendency to form phantom images is different from the situation found in case of the complementary residual image effect.

FIG. 5 shows the full color images of two pages 46 and 48 formed sequentially on the surface of the belt 34 and supplied to the transfuse zone 36. The direction in which the transfer and transfuse processes have proceeded is indicated by an arrow B. For simplicity, it is assumed that both pages 46 and 48 bear an identical image which consists of a green bar 50 and 52, respectively, on a uniform yellow background. The background may be assumed to have maximum achievable density of 100% for example. The residual image effect or the complementary residual image effect will then cause a phantom image 50' which will be visible as a slight shade of less saturated yellow, on the yellow background. The offset $\Delta y2$ between the bar 50 and its phantom image corresponds in this case to the circumferential length of the photoconductive drum c or y, respectively. Would this length be larger than the length of the page 46, then the phantom image 50' could as well occur on the subsequent page 48.

Another effect leading to phantom images will now be explained again with reference to FIG. 3.

In the example shown in FIG. 5, the bar 50 with cyan toner will be transferred onto the belt 34 in the transfer zone 30. When this bar reaches the subsequent transfer zone 32, a part of the cyan toner may be transferred onto the surface of the drum y. This effect is called "back transfer". After a full turn of the drum y, remnants of the cyan toner may be transferred again onto the belt 34, so that another phantom image 50" is created by the back transfer effect. In this case, the offset $\Delta y3$ will be the sum of $\Delta y2$ and the distance between the transfer zones 30 and 32.

In this case, the support medium subject to a sequence of process steps is considered to be the drum y. A first process step is the step in which the toner from the bar 50 is transferred back from the belt 34 onto the drum y. This process is, of course, associated with the image information of the pixel that has been printed some time before with the drum c. The subsequent process step at the drum y is the step in which the cyan toner deposited on the drum y is again transferred onto the belt 34 together with the yellow toner image formed on this drum.

The intensities of the phantom images 50' and 50" shown in FIG. 5 will depend on the parameters governing the transfer and back transfer processes in the transfer zones 30 and 32, e.g., the surface properties of the drums c and y and the belt 34, the physical properties of the toner materials, the pressure applied in the transfer zones and the like.

Figure 6:
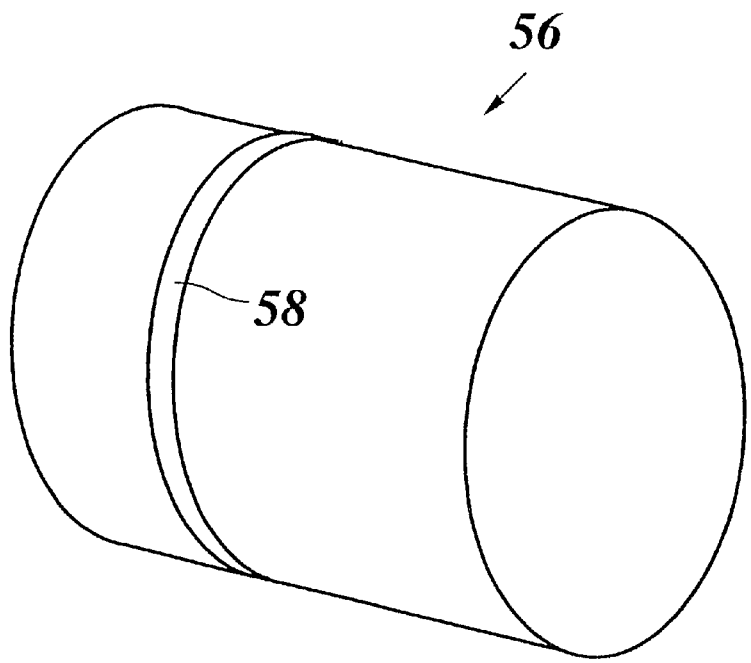
FIGS. 6 and 7 are diagrams for illustrating a direct induction printing process to which the present invention is also applicable.
Figure 7:
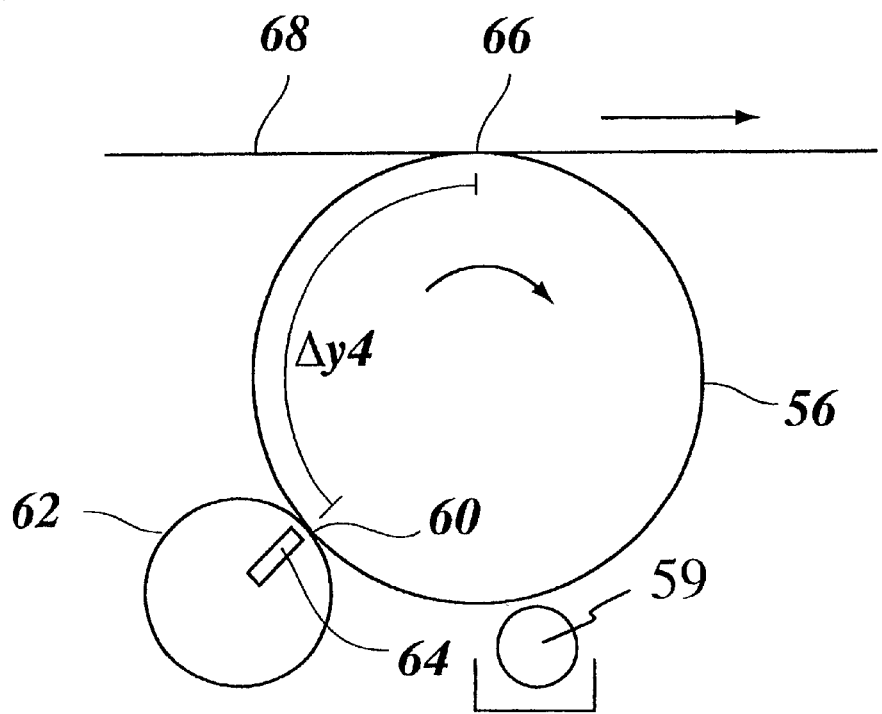

As another example for a digital printing process, FIGS. 6 and 7 illustrate a so-called direct induction process (DIP). FIG. 6 is a schematic perspective view of a so-called DIP-drum 56 which, in a certain sense replaces the photoconductive drum of the electrophotographic process. This drum comprises a large number of electrodes 58 extending around the circumferential direction of the drum. FIG. 6 shows only one of these electrodes, and the width thereof is largely exaggerated in the drawing. In practice, the width of each electrode corresponds to the width of an individual sub-pixel to be printed. The electrodes are covered with a thin dielectric layer.

As is shown in FIG. 7, an applicator roller 59 provides DIP-drum 56 with a uniform layer of a relatively electrically conductive toner powder, prior to entering an image forming zone 60, which extends over the entire length of the DIP-drum 56. A magnetic brush is created in the image-forming zone 60 by means of a stationary magnetic knife 64. When a pixel is to be developed at a certain point on the surface of the DIP-drum 56, a voltage is applied to the electrode 58 exactly at the moment at which this point passes through the image-forming zone 60. Thus, an electric field is created in the image-forming zone, which causes the toner to adhere to the surface of the DIP-drum 56. If no voltage is applied to the electrode 58, the toner is magnetically attracted to the surface of drum 62 and thus is removed from DIP-drum 62. Accordingly, an image can be printed in accordance with the image information supplied to the printer by energizing the pertinent electrodes 58 at the correct timings. With the rotation of the DIP-drum 56, the developed image formed thereon is conveyed to a transfer zone 66 where it is transferred onto a recording medium 68 which may be a sheet of copy paper or an intermediate image carrier. A more detailed description of the direct induction printing process with several embodiments and of a DIP-drum construction are found in U.S. Pat. No. 4,884,188, incorporated herein by reference. In the DIP process, the support medium is the DIP-drum 56, and one process step applied to each point on the surface of this drum is the image formation step performed in the image forming zone 60. Subsequent process step is the transfer of the developed image onto the recording medium 68 at the transfer zone 66.

Considering an individual electrode 58 of the Dip-Drum 56, the potential of this electrode is determined by the image information of the pixel to be formed in the image-forming zone 60. However, the same potential will also be present in the transfer zone 66 and will influence the transfer of toner for a pixel which has been developed earlier. This effect, which is called "electric effect", again leads to the occurrence of a phantom image on the image recording medium 68. The offset Δy4 between the phantom image and the original image is in this case determined by the length of the arc from the image-forming zone 60 to the transfer zone 66 along the circumference of the drum 56. Parameters determining the intensity of the phantom image will in this case comprise the surface properties of the recording medium 68 and the drum 56, the voltage applied to the electrode 58, the pressure applied in the transfer zone 66 and the like.

In a practical copier or printer, various effects leading to phantom images of the types described above may occur in combination.

Figure 8:
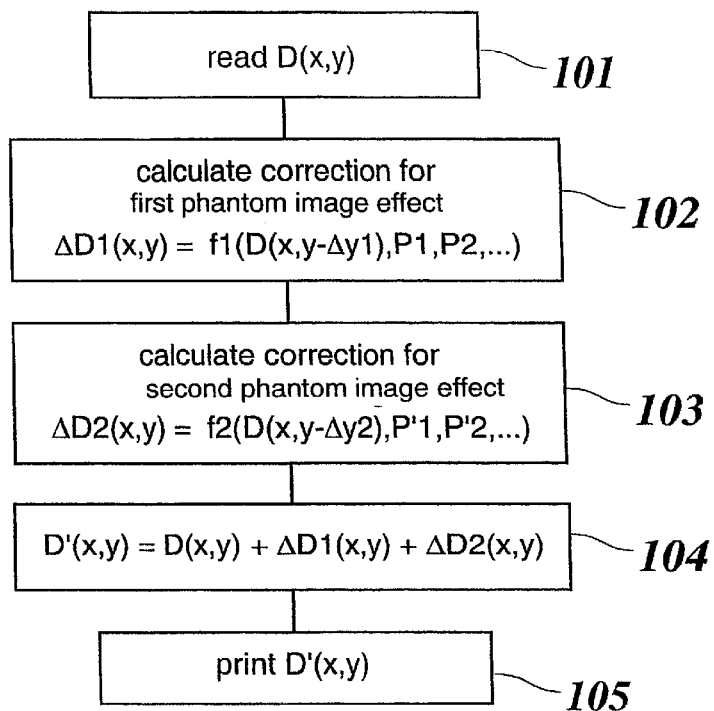
FIGS. 8 and 9 are flow charts for explaining two embodiments of the present invention.

FIG. 8 illustrates a first embodiment of a method for suppressing such phantom images by means of digital image processing.

In step 101, the image information, i.e., the image density D(x, y) (for black or any of the color components) for a pixel to be printed at a coordinate position (x,y) is read. The coordinate x indicates for example the position of the pixel in axial direction of the photoconductive drum 10 in FIG. 1, the drum c or y in FIG. 3 or the DIP-drum 56 in FIG. 7. The coordinate y indicates the position of the pixel in the direction orthogonal to the x-direction, i.e., the direction of movement of the support medium (drum 10, c, y or 56). Normally, the y-coordinate will indicate the position of the pixel on the image as finally printed, with, for example, the leading edge of the page as reference point However, since the timing at which the leading edge of the page is printed will be known beforehand, it requires only a simple (linear) transformation to identify each coordinate value y with the position along the circumference of the support medium which is involved in developing this pixel. It can therefore be assumed here for simplicity that y directly indicates the position on the support medium relative to a suitable reference point. If the support medium is an endless medium, e.g., an endless belt or a drum as in the embodiments described above, then the position on the support medium is given by y modulo U, wherein U is the circumferential length of the support medium. Conversely, if the position on the support medium is known, the corresponding y-value can be restored by taking the number of cycles of the support medium into account.

In order to the handle cases in which a phantom image is formed on a subsequent page, as the phantom image 50" in FIG. 5, it shall be allowed that the coordinate y extends over a plurality of pages. Then, when identifying the y-coordinate with the position on the support medium, the idle length of the support medium corresponding to the gap between subsequent pages must, of course, be taken into account. Such coordinate transformations will be a matter of routine for a person skilled in the art and will therefore not be described in detail.

In step 102, a correction ΔD1(x,y) for a first phantom image effect is calculated. This first phantom image effect may for example be the effect discussed in conjunction with FIG. 1, the residual image effect, the complementary residual image effect, the back transfer effect, the electric effect discussed in conjunction with FIG. 7 or any other predictable phantom image effect, depending on the printing process employed.

The purpose of the correction ΔD1(x,y) is to suppress the phantom image. For example, if the phantom image effect in consideration would lead to an increase in the density of the yellow component by a certain amount d, then this amount d would be subtracted from the density D(x,y), so that the final image will have the density specified by the image data. The correction ΔD1(x,y) is a function f1 which depends on the density D(x,y-Δy1) of the pixel which would cause the phantom image, and on a number of known parameters P1, P2, etc. of the printing and developing process, which parameters determine the intensity of the phantom image. In a first approximation, f1 can be considered as a linear function of the density D(x,y-Δy1), but a non-linear function may be used in a more elaborated embodiment.

In the example shown in FIG. 1, D(x,y) would specify the density of the pixel that is currently developed in the developing zone 12, and D(x,y-Δy1) would refer to the pixel which has been developed by the same point on the donor drum 14 exactly one turn earlier. The parameters P1, P2, ... would in this case relate to the electric and magnet field strength in the gap between the drums 10 and 14, the properties of the toner and the like.

It will be evident for a person skilled in the art how this correction procedure can be extended to suppress also phantom images of higher order by adding corrections for the pixel that had been developed two, three or more turns of the drum 14 earlier.

The parameters P1, P2, etc. will be fixed beforehand on the basis of empirical data and may be readjusted by the service personnel or, e.g., a key operator of the copier or printing machine, if necessary. In a modified embodiment, there may also be provided an algorithm for automatically adapting these parameters to aging of the toner and/or the mechanical components of the printing machine.

In the example shown in FIG. 8, it is assumed that there exist two effects which lead to significant phantom images. Thus, a calculation similar to the one in step 102 is performed in step 103 to find a correction ΔD2(x,y) for the second effect. In this case, the density has to be evaluated at the position (x,y-Δy2), wherein Δy2 is the offset pertinent for this effect, for example, the circumferential length of the drum c in FIG. 3 in case of the residual image effect.

Then, in step 104, a density D'(x,y) is calculated by adding the corrections ΔD1(x,y) and ΔD2(x,y) to the density D(x,y) read in step 101. The density D'(x,y) thus obtained is printed in step 105.

Figure 9:
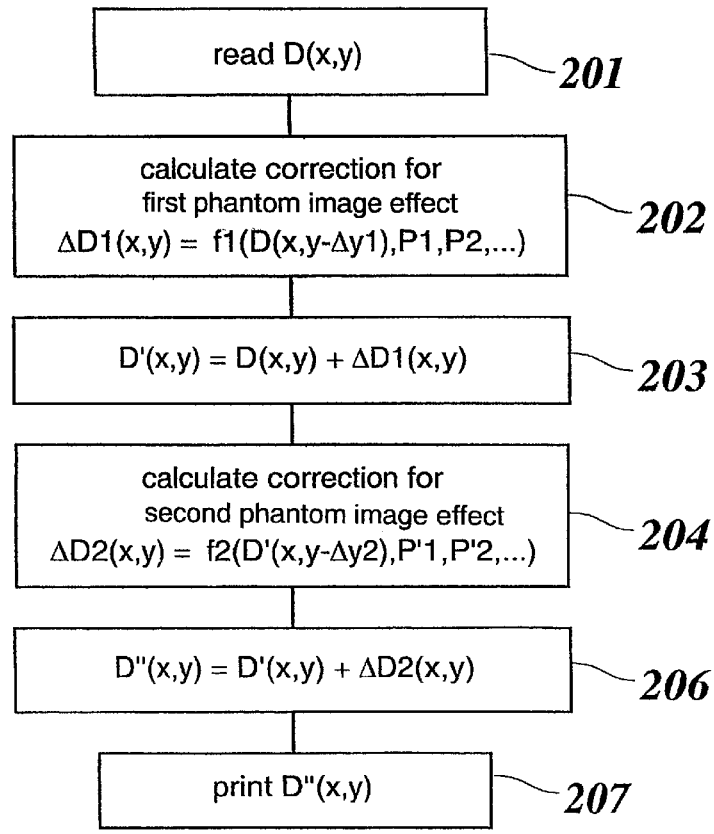

In a modified embodiment shown in FIG. 9, the steps 201 and 202 correspond to the steps 101 and 102 described above. Then, in step 203, the density D'(x,y) is calculated by adding the first correction to the original density.

The correction for the second phantom image effect is in this case calculated in step 204, but this time the correction ΔD2(x,y) is a function of the density D' which has previously been corrected in step 203 for the pixel with the coordinate position (x,y-Δy2). Then, this second correction is added in step 205, and the final density D"(x,y) is printed in step 206.

Thus, in the embodiment according to FIG. 9, the second correction in step 204 depends on the result of the first correction in step 202. This procedure may therefore reflect the actual influences of the various effects more exactly, if the sequence adopted for the corrections corresponds to the sequence in which the associated developing and/or transfer steps actually occur in the printer.

While only specific embodiments and fields of application or the invention have been described above, it will be understood that various modifications are possible and that the invention is also applicable to other phantom image effects which have not been described explicitly, and thus all these modifications and applications are considered to fall within the scope of the present invention.

What is claimed is:

1. A method for suppressing phantom images in a digital copying or printing process wherein toner material in the form of pixels of image information (D (x,y)), in which D is the image density for point x,y, is transferred through a sequence of process steps from an image registration medium to a final image receiving medium, where at least one process step is influenced in a predetermined manner by residual toner deposits resulting from at least one preceding process step for the same surface point x,y, which method comprises associating the image information for each pixel of image information to be printed on the basis of image information $D(x,y-\Delta y1)$ for at least the pixel associated with the same surface point x,y, and said preceding process step, so as to compensate for the influence of the residual toner deposits of said preceding process step.

2. The method according to claim 1, wherein the toner material is disposed on a support medium which supplies toner to a transfer zone where a latent image is developed by the toner, the sequence of process steps to which each point on the surface of said support medium is subjected being the developing steps occurring in the subsequent developing cycles of said support medium.

3. The method of claim 2, wherein the support medium is a donor drum or an endless donor belt.

4. The method according to claim 1, wherein said image registration medium is a photoconductive endless belt or drum.

5. The method according to claim 4, wherein the sequence of process steps to which each point on the surface of said photoconductive belt or drum is subjected comprises the steps in which said surface point is brought into contact with an intermediate image carrier in successive cycles of said belt or drum.

6. The method according to claim 1, wherein said image registration medium is a drum containing a plurality of electrodes extending around the surface thereof, and the sequence of process steps to which each point on the surface of this drum is subjected comprise a first step in which toner is adhered to the surface of the drum by energizing one or more electrodes thereof, and a subsequent step in which the toner thus adhered to the drum is transferred onto the image-recording medium.

7. The method according to claim 1, wherein the correction of image information depends on parameters which represent the properties and conditions of the process steps involved, and the method further comprises adjusting said parameters in accordance with the current status of the copying or printing machine.

8. An image reproduction system comprising a digital image processing system and a printer utilizing the method of claim 1.

9. The image reproduction system according to claim 8, wherein said printer is a color printer.

* * * * *